United States Patent [19]

Guézou et al.

[11] 4,354,262

[45] Oct. 12, 1982

[54] LOGIC SYSTEM FOR CONTROLLING A MODULAR MULTIPLEX CONNECTION UNIT IN A TIME-DIVISION SWITCHING EXCHANGE

[75] Inventors: Jean Guézou, Lannion; Bernard LeDieu, Perros Guirec; Jean-Pierre Martin, Pleumeur Bodou, all of France

[73] Assignee: Compagnie Industrielle des Telecommunications Cit-Alcatel, Paris, France

[21] Appl. No.: 146,853

[22] Filed: May 5, 1980

[30] Foreign Application Priority Data

May 4, 1979 [FR] France .................. 79 11321

[51] Int. Cl.³ .................. H04Q 11/04
[52] U.S. Cl. .................. 370/58; 364/200
[58] Field of Search .................. 364/200, 900; 370/58, 370/59, 63, 64, 66, 102

[56] References Cited

U.S. PATENT DOCUMENTS

| 3,516,074 | 6/1970 | Enomoto | 364/200 |
| 3,999,162 | 12/1976 | Leroy | 364/900 |
| 4,150,335 | 4/1979 | Cooperman | 370/59 |

Primary Examiner—Joseph A. Orsino, Jr.
Attorney, Agent, or Firm—Sughrue, Mion, Zinn, Macpeak & Seas

[57] ABSTRACT

A control logic system comprising at least one sub-system including a master processor, two slave processors and an interchange memory which exchanges information between the master processor and the slave processors. The slave processors access a common memory via an interprocessor interface.

6 Claims, 1 Drawing Figure

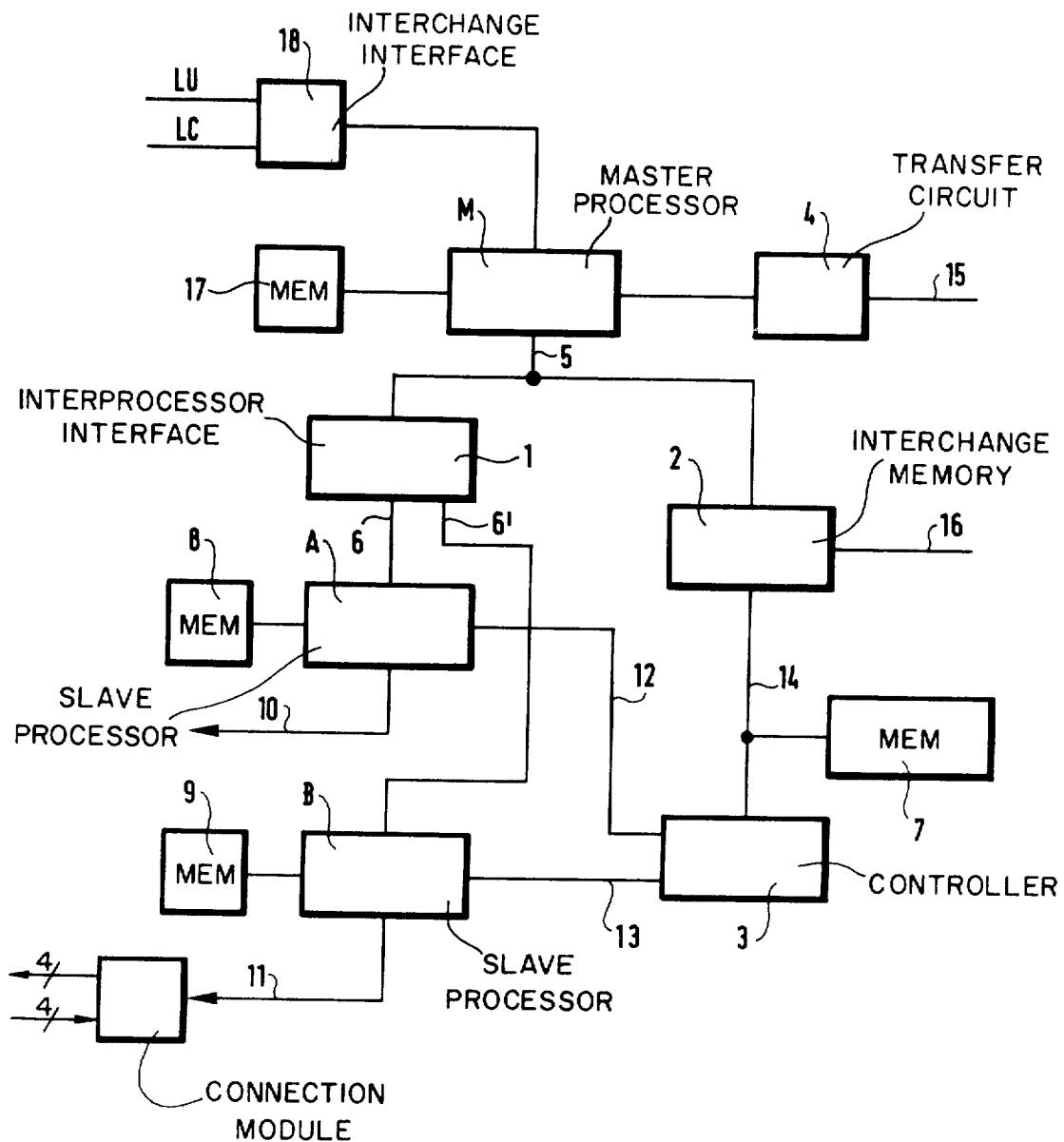

4,354,262

LOGIC SYSTEM FOR CONTROLLING A MODULAR MULTIPLEX CONNECTION UNIT IN A TIME-DIVISION SWITCHING EXCHANGE

BACKGROUND OF THE INVENTION

The present invention concerns the control of a multiplex connection unit in a time-division switching exchange.

As is well known, a time-division switching exchange is connected to electromechanical exchanges, to time-division exchanges or to remote concentrators known as "satellite" exchanges. Each exchange has its own, so-called "remote" clock, which is slightly out of synchronization with the local clock. The multiplex time slots must therefore be synchronised with the local clock before it is possible to detect a frame alignment word and a multiframe alignment word so as to be able to extract the signal sent in each frame by each multiplex line.

Multiplex connection units are described in the article by Feuerstein, Jacob, Renoulin and Guezou under the title "Groupe d'Equipements de synchronisation du système de commutation temporelle Platon", in the journal "Commutation et Electronique" No. 34, July 1971, pages 7 to 24.

These multiplex connection units are controlled by logic systems described by Jacob, Renoulin and Voyer in "Concentrateur spatio-temporel 500 abonnés pour système de commutation temporelle Platon E10" in the journal "Commutation et Electronique", No. 34, July 1971, pages 25 to 47.

The French patent application filed on the same date as the present application by the same applicants under the title "Dispositif de raccordement de multiplex dans un central de commutation temporelle" ("Multiplex connection device for time-division exchanges"), corresponding to copending U.S. Pat. application Ser. No. 146,985, filed May 5, 1980, describes a modular multiplex connection unit controlled by a logic system of the type described in the aforementioned article.

The control logic systems of known connection devices have the disadvantage that they are not able to control more than four connection modules, imposing constraints on exchange location since a large number of control logic circuits are required for all the multiplex lines to be synchronised.

SUMMARY OF THE INVENTION

The present invention is intended to alleviate the disadvantages of logic systems used to control multiplex connection units.

The present invention consists of a control logic system comprising at least one subsystem including a master processor, two slave processors, an interchange memory (interchanges between the master processor and the slave processors), a bus interface controller providing the slave processors with access to a common memory, and an interchange interface connecting the master processor to markers and a monitoring unit of the exchange.

The invention also consists of a control logic system comprising two identical subsystems, one of which is in service at any time with the other on standby.

DETAILED DESCRIPTION OF THE INVENTION

The invention will now be described with reference to one embodiment thereof and with reference to the accompanying drawing which is a block diagram of a control logic system in accordance with the present invention. The diagram shows one subsystem comprising a master processor (M), an interprocessor interface (1), an interchange memory (2), a bus interface controller (3) and slave processors A and B.

The master processor M is connected to a memory 17 and to an interchange interface 18 connected to markers of the exchange over link LU and to a monitoring unit of the exchange over link LC.

The master processor M is connected by a bus 5 to the interprocessor interface 1 and to the interchange memory 2. The interprocessor interface is connected by status links 6 and 6' to slave processors A and B, respectively. Slave processors A and B access the common memory 7 via the bus interface controller 3. Slave processor A is connected to program memory 8 and by a bus 10 to four connection modules. Slave processor B is connected to program memory 9 and by a bus 11 to four other connection modules. The bus interface controller 3 is connected by a bus 12 to slave processor A and by a bus 13 to slave processor B. It is further connected by a bus 14 to the interchange memory 2 and to the common memory 7. Common memory 7 comprises a scratch-pad area and telephone signal processing table area.

The interchange memory 2 is used for data interchanges between the master processor M and slave processors A and B, via the bus interface controller 3.

The master processor M and slave processors A and B are identical. Memories 7, 8, 9 and 17 are identical.

When another control logic system identical to that shown in the FIGURE is used for reasons of security, the other system controls the same connection modules as do slave processors A and B shown in the FIGURE. Thus the two control logic sub-systems do not operate simultaneously, a transfer circuit 4 switching between them. The transfer unit is connected to each master processor. Shown in the FIGURE is the link 15 to the master processor of the other subsystem (not shown). The interchange memory 2 of each subsystem is connected to that of the other sub-system by a bus 16.

The bus interface controller 3 has a dual function, the first of which is to generate time delays for each of the slave processors A and B. Its second function is to provide access to the common memory 7 for the address bus and data bus of each of the two slave processors.

The time delays are generated on the basis of data received from each slave processor. The interprocessor interface can store up to 2000 delays, representing two delays per time slot.

Slave processor access to the interchange memory 2 is provided by marshalling the two address buses and the two data buses which constitute bus 14, each slave processor being connected to the bus interface controller 3 by an address bus and a data bus. The interchange memory 2 is thus connected to the bus interface controller by the bus 14, consisting of an address bus and a data bus, each obtained by marshalling the address buses and data buses of the slave processors. Marshalling is readily implemented by switches which are enabled according to the order of arrival of requests from slave processors A and B for access to the interchange memory 2. For the transmission of messages from the interchange memory 2 to the slave processors, gates switch the address bus of bus 14 to one of the two address buses of buses 12 and 13 and the data bus of bus 14 to one of the two data buses of buses 12 and 13. On receipt of a request from a slave processor, a "not ready" signal is sent to the other slave processor. When the request has been met, the "not ready" signal is removed and the other slave processor may access the interchange memory.

The interchange memory 2 stores the states of the time slots of the connection modules and permits the exchange of data between all processors. Its capacity is 8000 words each of 9 bits, eight bits in each word being used. For data interchanges internal to the control logic system, write and read operations may be commanded by the master processor or by the slave processors. Write and read fields are reserved for each master and slave processor. For interchanges with another subsystem (duplicated control subsystems), the other subsystem can access the interchange memory 2 via bus 16 only in read mode.

The bus interface controller 3 is connected to each slave processor by a respective bus 12, 13. Each of these buses comprises a data bus and an address bus. The bus interface controller 3 marshalls the data buses and address buses of buses 12 and 13 for connections to the interchange memory 2 and the common memory 7. It also switches the data bus and address bus of bus 14 toward the address bus and data bus of each of buses 12 and 13 for messages to slave processors A and B. The interchange memory receives calls from master processor M and slave processors A and B. Via bus 16, which comprises a data and an address bus, it also receives calls from the other control logic subsystem. Buses 5, 14 and 16 are serviced according to a cyclic priority order.

In the case of duplicated control logic subsystems, the transfer unit 4 switches from one subsystem to the other. Transfer occurs in response to a malfunction detected in one subsystem, or under manual control, or at regular intervals if no malfunction is detected.

The term "malfunction" should be understood as meaning any parameter state conditioning transfer. The control logic subsystem in operation is called the "control" subsystem. The other subsystem is called the "standby" subsystem. The transfer unit receives malfunction indications from the two control logic subsystems and also manual requests for transfer. Transfer occurs only if the "standby" subsystem is not subject to a malfunction. On receipt of a transfer request, a call is sent to the standby control logic subsystem and transfer is enabled only in the event of a positive response therefrom.

The control logic system provides all the usual telephone functions: control of changes of state prior to transmission to destination, calls to markers to signal new calls and call terminations, transfer of common channel signalling messages.

A control logic subsystem is connected to two markers by link LU, interchanges using a 125 microsecond frame derived from the 1.28 MHz clock signal ($\theta$) provided by the exchange time base. The frame is sudivided to form 32 time slots t0 to t31.

The first half of the frame is reserved for supervisory signals exchanged between the markers and the multiplex connection unit, via the control logic system.

An interchange interval tn is allocated to each connection module. $tn\theta 2$ is for the call from the first marker to connection module n, or vice versa. $tn\theta 4$ is for the call from the second marker to connection module n or vice versa. $tn\theta 1$ is for the link test bit.

The second half of the frame is reserved for the transmission of messages, time slots t16 to t23 for the first marker and time slots t24 to t31 for the second marker. An odd parity check bit is placed at the end of the message: $t23\theta 3$ or $t31\theta 3$.

If the message is received correctly, the receiving unit sends an acknowledgement bit in the same frame ($t23\theta 5$ for the first marker, $t31\theta 5$ for the second marker).

If a parity fault is detected by the control logic system the acknowledgement signal is not sent. The LU link is transferred, each marker link being duplicated for reasons of security, and the malfunction is signalled to the exchange monitoring unit. The marker repeats the erroneous message, including the handshaking procedure.

The control logic system responds (without any handshaking procedure) in the interval corresponding to the marker. In the event of a parity error the marker does not send the acknowledgement signal. Instead it transfers the link and signals the malfunction to the monitoring unit. The connection module repeats the message once.

Messages sent at the initiative of the control logic system use the handshaking procedure, the transmission method being strictly identical to that used for messages sent at the initiative of the markers.

The control logic system is also connected to the monitoring unit via link LC. Interchanges use a 125 microsecond frame derived from the 1.28 MHz clock signal ($\theta$). The frame is subdivided to form 32 time slots t0 to t31. The first half of the frame is used to transmit supervisory signals: handshake signals, positioning signals. The second half is used for transmission of operation and maintenance messages. Calls to the control logic system and positioning operations are executed in the first half of the frame, using a call number characterising the control logic system. The exact destination for operation and maintenance messages is given in $t18\theta 4$ and $t18\theta 5$, using the following codes: 00 designates a remote connection unit, 01 designates a connection module, 10 designates the control logic system (one of the two subsystems).

Positioning operations for the control logic system use a code sent in the interval allocated to the control logic system:

F1 selects "test"
F2 selects "in service"
F3 selects "out of order".
F1 substitutes test links LU' for links LU.

Any change of state from "out of order" or "test" to "in service" resets the entire control logic system to 0.

We claim:

1. A logic system for controlling a modular multiplex connection unit including a plurality of connection modules in a time-division exchange, the logic system comprising at least one subsystem including a master processor (M), two slave processors (A, B) each controlling half the connection modules and each connected to a separate memory (8, 9), an interchange memory (2) connected to a common memory (7) and to the slave processors via a bus interface controller (3) and to the master processor, an interprocessor interface (1) connected to the master processor and to each slave processor, and an interchange interface (18) connected to the master processor and to markers and a monitoring unit of a switching centre.

2. A system according to claim 1, wherein said logic system comprises two identical subsystems, each subsystem being connected to the same said multiplex connection unit with the master processor in each of said subsystems connected to a transfer unit (4) which switches between the subsystems, the interchange memory (2) in each subsystem being connected to the other subsystem.

3. A system according to claim 1 or claim 2, wherein the master processor and slave processors are identical.

4. A system according to claim 1 or claim 2, wherein the common memory (7) and the memories (8, 9) associated with the slave processors (A, B) are identical.

5. A logic system according to claim 1 or claim 2, wherein the slave processors access the interchange memory (2) via the bus interface controller (3), in the order of receipt of requests for access from the slave processors.

6. A system according to claim 1 or claim 2, wherein said connection unit comprises eight connection modules, each connection module being connected to four incoming multiplex lines and four outgoing multiplex lines.

* * * * *